Oct. 26, 1926.
E. A. KEELER
IONIC CONCENTRATION METER
Filed May 7, 1920
1,604,584
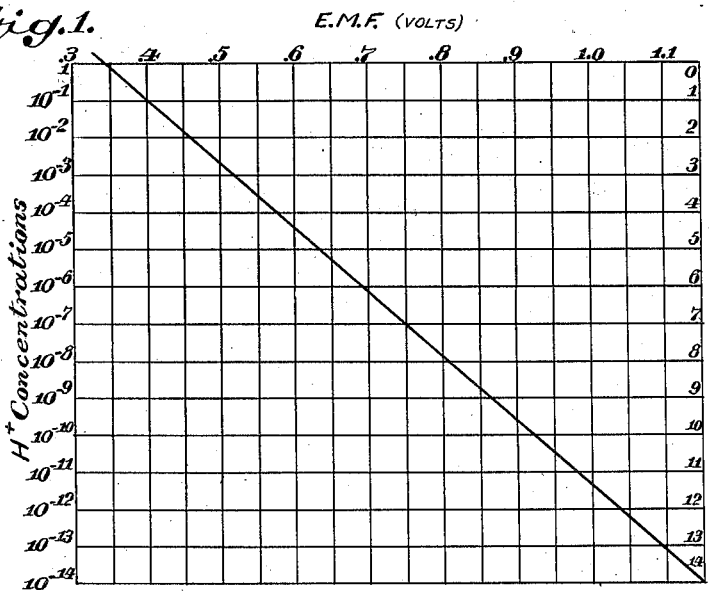
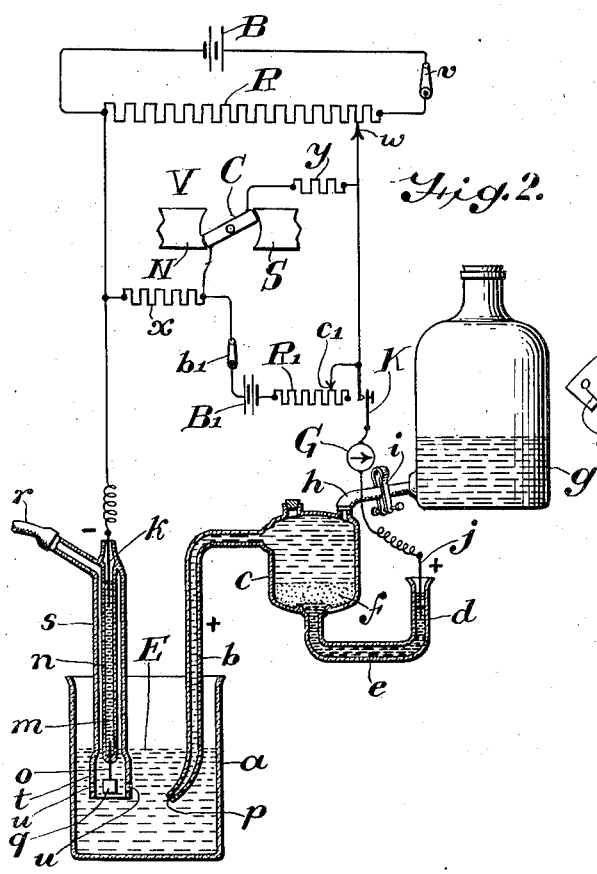
INVENTOR.
Earl A. Keeler
BY Cornelius D. Ehret
his ATTORNEY.

Patented Oct. 26, 1926.

1,604,584

UNITED STATES PATENT OFFICE.

EARL A. KEELER, OF NORRISTOWN, PENNSYLVANIA, ASSIGNOR TO LEEDS & NORTHRUP COMPANY, OF PHILADELPHIA, PENNSYLVANIA, A CORPORATION OF PENNSYLVANIA.

IONIC-CONCENTRATION METER.

Application filed May 7, 1920. Serial No. 379,657.

My invention relates to apparatus for measuring the ionic concentration of a solution by measuring the difference of potential between suitable electrodes in contact with the solution.

My invention resides in measuring apparatus of the character referred to comprising a voltmeter for measuring the voltage or potential difference representative of the ionic concentration, the voltmeter having a scale calibrated in any suitable units, and preferably calibrated directly in units of ionic concentration, with means associated with the voltmeter for suppressing its zero, that is, for rendering available for readings or calibrations the entire extent of the voltmeter scale.

My invention resides in apparatus of the character hereinafter described and claimed.

For an understanding of my invention and for an illustration of one of the various forms my apparatus may take, reference is to be had to the accompanying drawing, in which:

Fig. 1 is a graphic representation of relations between electro-motive-forces and ionic concentrations.

Fig. 2 is a diagram of circuits and representation of apparatus.

Fig. 3 is a representation of the voltmeter scale.

The relation between the concentration of a particular or selected ion and the potential difference between electrodes of predetermined nature in contact with the solution containing the particular or selected ions is known or determined. For the purposes of explanation, it will be assumed that the concentration of hydrogen ions is to be measured, though it will be understood that my invention is not limited to the nature of the ions whose concentration is to be measured nor to the employment of electrodes of the particular character hereinafter referred to. For measurements of hydrogen ion concentration there may be employed a so-called hydrogen electrode and a so-called calomel electrode or half cell. When such electrodes are employed, the relations between the potential differences between the electrodes and ionic concentrations may be represented graphically as indicated in Fig. 1, wherein abscissæ or horizontal distances represent potential differences or electro-motive-forces in volts, while the ordinates or vertical distances represent ion concentrations either in H+ units or in Sörensen's $P_H$ values.

The electrolyte of which the hydrogen ion concentration is to be measured is brought into contact with the electrodes and the resultant electro-motive-force read on the voltmeter whose scale is calibrated directly in the aforesaid H+ units or, as in the example herein illustrated, in the $P_H$ units.

An inspection of Fig. 1, however, shows that for the lowest $P_H$ value (which may be termed a predetermined or normal value of ion concentration) there is produced a substantial potential difference, practically .337 volt, with the result that the voltmeter would produce a deflection corresponding with that voltage, and the readings or calibrations of its scale would begin at a considerable distance above the true zero of the voltmeter, whereby a considerable portion of the angular extent of the voltmeter scale would not be availed of.

In accordance with my invention, the voltmeter scale is calibrated with its zero of $P_H$ values corresponding with the true zero of the voltmeter, electrical means being associated with the voltmeter for so suppressing its zero.

Referring to Fig. 2, the electrolyte E whose hydrogen ion concentration is to be measured is placed in any suitable container, as a beaker $a$. The positive electrode is of liquid $p$ contacting with the electrolyte E at the orifice of the capillary end of a tube $b$ communicating with the vessel $c$ having the tubular extension $d$ containing mercury $e$ contacting with a tenth normal solution of potassium chloride in vessel $c$, powdered calomel, i. e., monochloride of mercury being provided as indicated at $f$ in the bottom of the vessel $c$. From any suitable reservoir, as bottle $g$ containing the tenth normal solution of potassium chloride, there extends a connection $h$, controlled by cock $i$, to the vessel $c$, which receives the potassium chloride solution in which is dissolved some of the calomel, the solution extending through the tube $b$ into contact with the electrolyte E at $p$. Into the mercury $e$ extends the conductor $j$ constituting the positive terminal of the cell. The terminal $k$ of the negative electrode structure of the cell extends into the mercury $m$ within the inner tube $n$, through whose lower end is sealed the conductor $o$ in contact with the mercury $m$ and connected with and supporting the plate $q$, as of platinum or gold, usually covered with platinum, iridum or palladium black, in contact with the electrolyte E and hydrogen gas supplied under suitable pressure through the tube $r$ into the interior of the outer tube $s$, passing downwardly through the annular space between the tubes $n$ and $s$ into contact with the aforesaid plate $q$ within the bell or chamber $t$ and passing out through the lateral apertures or holes $u$ and bubbling up through the electrolyte E and escaping to the atmosphere.

When the concentration of other than hydrogen ions is to be measured, the negative electrode will be suitably different from the hydrogen electrode above described. For example, if a concentration of chlorine ions is to be measured, chlorine gas may be delivered through the tube $r$ into contact with the plate $q$. For oxidation and reduction measurements the electrode $q$ may be platinum, and without delivery of gas through the tube $r$.

Inasmuch as draft of substantial current from the electrolytic cell is not desirable because of resultant polarization effects, it is preferable to balance the electro-motive-force of the cell against an equal and opposite electro-motive-force. To this end there is employed a resistance R in series through the switch $v$ with the direct current source, as battery B. One terminal of the cell is connected to the resistance R and the other terminal is connected through the galvanometer G and key K with the contact $w$ slidable along the resistance R. Bridged across the variable portion of the resistance R is a voltmeter V of any suitable type. Preferably it is of the moving coil-permanent magnet field type, that is, the D'Arsonval type. N and S represent the poles of the permanent magnet system between which is mounted for rotary deflection the movable coil C in series with which are connected usual voltmeter resistances, as $x$ and $y$. The deflection of the coil C will therefore be a measure of the fall of potential in the resistance R between the contact $w$ and the left end of the resistance R. The source of current B is of sufficient capacity to deliver ample current through the resistance R and for deflecting the voltmeter coil.

As well understood in the art of galvanometers or voltmeters, there is attached to the movable coil C a needle or pointer which sweeps across a scale whose calibrations may be in units of voltage or any corresponding units.

Inasmuch as for the highest hydrogen ion concentration of the electrolyte E the potential difference between the electrodes is practically .337 volt, for such maximum ionic concentration the voltmeter will without suppression of its zero, produce a deflection corresponding with that voltage. Accordingly the useful part of the scale of the voltmeter for reading ionic concentrations would begin at a point above the true zero of the voltmeter, the latter corresponding with the position of the pointer or needle when zero current flows through the coil C.

This will be appreciated upon reference to Fig. 3, where there is shown a voltmeter scale the true zero of which corresponds with the marking $z$, while the deflection of the voltmeter needle for the aforesaid .337 volt would, without suppression of the zero, correspond substantially with the marking indicated at $a^1$. The useful part of the scale would then be that to the right of the marking $a^1$, which is obviously less than the entire scale extent.

To cause the deflection of the voltmeter V to be zero when ionic concentration is at its maximum, that is, when producing a voltage of .337 volt or, in other words, to suppress the zero of the voltmeter V so that the current through its coil C is zero when the voltage of the cell is .337, there is connected in shunt to the entire or any suitable part of the moving coil circuit of the voltmeter a variable resistance $R^1$ and battery $B^1$. In the example illustrated this resistance and battery are connected to one terminal of the coil C through the switch $b^1$, and the slider contact $c^1$ is connected to a terminal of the voltmeter resistance $y$, the battery $B^1$ being connected in such sense as to oppose the electro-motive-force impressed upon the voltmeter V by the battery B through a portion of the resistance R. The resistance $R^1$ is adjusted to such value that when the contact $w$ is in such position on the resistance R that the voltage across the terminals of the voltmeter V is the aforesaid .337 volt, there will be zero current in the coil C, and the needle of the voltmeter will therefore point at the marking $z$ of the scale, Fig. 3.

The scale is calibrated in the example illustrated in the $P_H$ values ranging, in the example indicated, from zero to 14. By the arrangement described the useful length of the scale is increased by the angular distance between the marks $z$ and $a^1$. Otherwise the fourteen scale divisions would be crowded within the angular distance between the point $a^1$ and the right end of the scale. The apparatus is employed as follows:

The electrolyte whose hydrogen ion concentration is to be measured is introduced into the container $a$ and the key K closed and the contact $w$ moved along the resistance R to such point that the deflection of the galvanometer G is nil; the voltmeter V then deflects its needle across the scale, and the tion, and a scale for said voltmeter calibrated in values of ionic concentration and having its one extreme value corresponding with zero deflection of said voltmeter.

11. Apparatus for measuring ionic concentration comprising a voltmeter responsive to the voltage produced by the solution containing the ions whose concentration is to be measured, said voltmeter having a permanent magnet field and a deflecting coil, and an opposing source of current and resistance associated with said coil for suppressing the zero of said voltmeter by an amount corresponding with the voltage corresponding with a predetermined concentration.

12. Apparatus for measuring ionic concentration comprising a voltmeter responsive to the voltage produced by the solution containing the ions whose concentration is to be measured, said voltmeter having a permanent magnet field and a deflecting coil, an opposing source of current and resistance associated with said coil for suppressing the zero of said voltmeter by an amount corresponding with the voltage corresponding with a predetermined concentration, and a scale for said voltmeter calibrated in values of ionic concentration and having its one extreme value corresponding with zero deflection of said voltmeter.

13. Apparatus for measuring ionic concentration comprising a voltmeter responsive to the voltage produced by the solution containing the ions whose concentration is to be measured, said voltmeter having a permanent magnet field, a coil deflecting in said field, resistance in circuit with said coil, and an opposing source of current and a resistance connected in a circuit with said coil and resistance for suppressing the zero of said voltmeter by an amount corresponding with the voltage corresponding with a predetermined concentration.

14. Apparatus for measuring ionic concentration comprising a voltmeter responsive to the voltage produced by the solution containing the ions whose concentration is to be measured, said voltmeter having a permanent magnet field, a coil deflecting in said field, resistance in circuit with said coil, an opposing source of current and a resistance connected in circuit with said coil and resistance for suppressing the zero of said voltmeter by an amount corresponding with the voltage corresponding with a predetermined concentration, and a scale for said voltmeter calibrated in values of ionic concentration and having its one extreme value corresponding with zero deflection of said voltmeter.

15. Apparatus for measuring ionic concentration comprising a deflecting voltmeter, and means for impressing thereon an opposing electro-motive-force corresponding with the voltage corresponding with a predetermined ion concentration.

16. Apparatus for measuring ionic concentration comprising a deflecting voltmeter, means for impressing thereon an opposing electro-motive-force corresponding with the voltage corresponding with a predetermined ion concentration, and a scale for said voltmeter reading in values of ion concentration and having one of its extreme markings in position corresponding with zero deflection of said voltmeter.

17. Apparatus for measuring ionic concentration comprising means for producing a potential difference corresponding with the voltage produced by the solution containing the ions whose concentration is to be measured, a galvanometer subjected to said potential difference, and means for impressing upon said galvanometer an opposing electro-motive-force corresponding with a predetermined ion concentration.

18. Apparatus for measuring ionic concentration comprising means for producing a potential difference corresponding with the voltage produced by the solution containing the ions whose concentration is to be measured, a deflecting voltmeter subjected to said potential difference, means for impressing upon said voltmeter an opposing electro-motive-force corresponding with a predetermined ion concentration, and a scale for said voltmeter calibrated in values of ion concentration and having one of its extreme markings in position corresponding with zero deflection of said voltmeter.

19. Apparatus for measuring ionic concentration comprising a voltmeter subjected to a voltage corresponding with the ion concentration to be measured, said voltmeter comprising means for producing a magnetic field and a coil deflecting in said field, and means for impressing upon the circuit of said coil an opposing electro-motive-force corresponding with a predetermined ion concentration.

20. Apparatus for measuring ionic concentration comprising a voltmeter subjected to a voltage corresponding with the ion concentration to be measured, said voltmeter comprising means for producing a magnetic field and a coil deflecting in said field, means for impressing upon the circuit of said coil an opposing electro-motive-force corresponding with a predetermined ion concentration, and a scale for said voltmeter calibrated in values of ion concentration and having one of its extreme markings in position corresponding with zero deflection of said voltmeter.

21. An ion concentration meter comprising means producing a magnetic field, a coil deflecting in said field through angular extents substantially proportional to the strength of current traversing said coil reading on the scale beneath the needle is then that of the hydrogen ion concentration of the electrolyte in terms of $P_H$ values.

It will accordingly be seen that the voltmeter is not only direct reading in units of ionic concentration, but that the entire scale range is available, thus in effect lengthening the scale and making possible greater accuracy in readings.

What I claim is:

1. Apparatus for measuring ionic concentration comprising a deflecting galvanometer, and means for impressing on said galvanometer an electro-motive-force of such magnitude and in such sense that its deflection is zero for the voltage corresponding with normal ionic concentration.

2. Apparatus for measuring ionic concentration comprising a deflecting voltmeter, means impressing on said voltmeter an electro-motive-force of such magnitude and in such sense that the deflection of said voltmeter is zero for the voltage corresponding with a predetermined ionic concentration, and a scale for said voltmeter calibrated in values of ionic concentration and having one of its extreme markings in position corresponding with zero deflection of said voltmeter.

3. Apparatus for measuring ionic concentration comprising a deflecting voltmeter, and means impressing on said voltmeter an electro-motive-force of magnitude and in a sense for suppressing the zero thereof by an amount corresponding with the voltage corresponding with a definite concentration of the ions whose concentration is to be measured.

4. Apparatus for measuring ionic concentration comprising a deflecting voltmeter, means impressing on said voltmeter an electro-motive-force of magnitude and in a sense for suppressing the zero thereof by an amount corresponding with the voltage corresponding with a predetermined concentration of the ions whose concentration is to be measured, and a scale for said voltmeter calibrated in values of ionic concentration.

5. Apparatus for measuring ionic concentration comprising a deflecting voltmeter, and means for electrically suppressing its zero to correspond with the voltage corresponding with a predetermined concentration of the ions whose concentration is to be measured, said means comprising a source of opposing electro-motive-force and a resistance.

6. Apparatus for measuring ionic concentration comprising a deflecting voltmeter, means for suppressing its zero to correspond with the voltage corresponding with a predetermined concentration of the ions whose concentration is to be measured, said means comprising a source of opposing electro-motive-force and a resistance, and a scale for said voltmeter calibrated in values of ionic concentration and having its one extreme value corresponding with zero deflection of said voltmeter.

7. Apparatus for measuring ionic concentration comprising a source of current and a resistance, a voltmeter connected across a portion of said resistance variable to magnitude such that the fall of potential therein is equal to the potential difference produced by the solution containing the ions whose concentration is to be measured, and means impressing on said voltmeter an electro-motive-force of magnitude and in a sense for suppressing the zero of said voltmeter to correspond with the voltage produced by a predetermined ionic concentration.

8. Apparatus for measuring ionic concentration comprising a source of current and a resistance, a voltmeter connected across a portion of said resistance variable to magnitude such that the fall of potential therein is equal to the potential difference produced by the solution containing the ions whose concentration is to be measured, means impressing on said voltmeter an electro-motive-force of magnitude and in a sense for suppressing the zero of said voltmeter to correspond with the voltage produced by a predetermined ionic concentration, and a scale for said voltmeter calibrated in values of ionic concentration and having its one extreme value corresponding with zero deflection of said voltmeter.

9. Apparatus for measuring ionic concentration comprising a source of current and a resistance, a voltmeter connected across a portion of said resistance variable to magnitude such that the fall of potential therein is equal to the potential difference produced by the solution containing the ions whose concentration is to be measured, and means for suppressing the zero of said voltmeter comprising a source of current and a resistance of a magnitude to reduce the effective voltage impressed upon said voltmeter by a value corresponding to a predetermined electro-motive-force corresponding with a predetermined ionic concentration of said solution.

10. Apparatus for measuring ionic concentration comprising a source of current and a resistance, a voltmeter connected across a portion of said resistance variable to magnitude such that the fall of potential therein is equal to the potential difference produced by the solution containing the ions whose concentration is to be measured, means for suppressing the zero of said voltmeter comprising a source of current and a resistance of a magnitude to reduce the effective voltage impressed upon said voltmeter by a value corresponding to a predetermined electro-motive-force corresponding with a predetermined ionic concentration of said soluthroughout a range of approximately ninety degrees, electrical means causing zero deflection of said coil for the voltage corresponding with a predetermined ionic concentration, and a scale calibrated in values of ion concentration having an extent of approximately ninety degrees and having its marking corresponding with said predetermined ion concentration in position corresponding with zero deflection of said coil.

In testimony whereof I have hereunto affixed my signature this 3 day of May, 1920.

EARL A. KEELER.